US008666747B2

(12) United States Patent
Sartini

(10) Patent No.: US 8,666,747 B2
(45) Date of Patent: Mar. 4, 2014

(54) PROVIDING INFORMATION REGARDING INTERACTIVE VOICE RESPONSE SESSIONS

(75) Inventor: Robert A Sartini, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2724 days.

(21) Appl. No.: 10/284,398

(22) Filed: Oct. 31, 2002

(65) Prior Publication Data

US 2004/0088167 A1 May 6, 2004

(51) Int. Cl.
*G10L 23/00* (2009.01)

(52) U.S. Cl.
USPC .......................................................... 704/270

(58) Field of Classification Search
USPC ........ 704/276, 270.1, 270, 235, 88.17, 88.11, 704/88.1, 88.09, 88.08, 257, 275
See application file for complete search history.

(56) References Cited

U.S. PATENT DOCUMENTS

| | | | | |
|---|---|---|---|---|
| 5,918,222 A * | 6/1999 | Fukui et al. | ............................ | 1/1 |
| 6,094,476 A * | 7/2000 | Hunt et al. | ................. | 379/88.04 |
| 6,112,172 A * | 8/2000 | True et al. | ...................... | 704/235 |
| 6,278,772 B1 * | 8/2001 | Bowater et al. | ............. | 379/88.13 |
| 2003/0154072 A1 * | 8/2003 | Young et al. | ...................... | 704/9 |
| 2004/0193420 A1 * | 9/2004 | Kennewick et al. | ........... | 704/257 |

FOREIGN PATENT DOCUMENTS

| | | | | |
|---|---|---|---|---|
| WO | WO 01/74042 | | 10/2001 | |
| WO | WO 01/74042 A2 * | | 10/2001 | ........................ 704/9 |

* cited by examiner

*Primary Examiner* — Abul Azad

(57) ABSTRACT

A user, using, for example, a web browser and application server technology, is able to consolidate and present session information, for example, from a multi-model session on a voice recognition system. For example, a web browser can be used to display consolidated session information comprising network information, call logs, location database information, recorded user utterances, voice portal prompts, or any other information associated with an interactive voice response system.

22 Claims, 14 Drawing Sheets

Fig. 2

S.P.Y.E.R
Services Protecting Your Engineering Resources
Version 2.7

Logs selected [current] = nrdbe011=spyer.log.20020205_000000 nrdbe021=spyer.log.20020205_000000 ~ 410

SPYing on what sessions were created

450 ~ FILTER = NONE

430 ~ View All Sessions - Select Report ~ 440

500 ~ The following sessions were found.

| | Date Started 470 | InProg 480 | Duration 490 | Device 500 | Source 510 | AccessData 520 | RemoteAddr 530 | AppData 540 |
|---|---|---|---|---|---|---|---|---|
| 1 | Tue Feb 05 00:23:38 GMT 2002 | no | 1 minute 40 seconds | VB | [Ani=360 7108480] [User=U-U] | [Org=Bank_of_America-139684] [Num=8007114307] | [Host=nrdvb071] [Port=T5-Ln_097-B1] | [Host=nrdbe011] [Svcs=transfer] |
| 2 | Tue Feb 05 00:29:21 GMT 2002 | no | 1 minute 39 seconds | VB | [Ani=703 2260303] [User=U-U] | [Org=Bank_of_America-139684] [Num=8007114307] | [Host=nrdvb041] [Port=T1-Ln_001-B1] | [Host=nrdbe021] [Svcs=transfer] |
| 3 | Tue Feb 05 00:35:19 GMT 2002 | no | 4 minutes 25 seconds | VB | [Ani=425 2107824] [User=U-U] | [Org=Bank_of_America-139684] [Num=8007114307] | [Host=nrdvb051] [Port=T1-Ln_001-B1] | [Host=nrdbe021] [Svcs=transfer] |
| | Tue Feb 05 00:39:52 GMT | | 5 minutes | VB | [Ani=912 7565446] | [Org=Bank_of_America-135641] | [Host=nrdvb051] | [Host=nrdbe021] |

Fig. 4.

| | | | | | | |
|---|---|---|---|---|---|---|
| 91 | Tue Feb 05 16:52:31 GMT 2002 | no | 2 minutes 21 seconds | VB | [An=469 3430019] [User=U-U] | [Org=Bank_of_America-139684] [Num=8007114307] | [Host=nrdbe041] [Port=T2-Ln_025-B24] | [Host=nrdbe021] [Svcs=transfer] |
| 92 | Tue Feb 05 16:54:51 GMT 2002 | no | 6 minutes 9 seconds | VB | [An=773 3277698] [User=U-U] | [Org=Bank_of_America-139684] [Num=8007114307] | [Host=nrdbe041] [Port=T2-Ln_025-B24] | [Host=nrdbe011] [Svcs=transfer] |
| 93 | Tue Feb 05 16:56:03 GMT 2002 | yes | 16 seconds | VB | [An=540 3621278] [User=U-U] | [Org=Bank_of_America-139684] [Num=8007114307] | [Host=nrdvb071] [Port=T5-Ln_097-B1] | [Host=nrdbe011] [Svcs=transfer] |
| 94 | Tue Feb 05 16:57:52 GMT 2002 | no | 3 minutes 47 seconds | VB | [An=214 5087711] [User=U-U] | [Org=Bank_of_America-139684] [Num=8007114307] | [Host=nrdvb051] [Port=T1-Ln_001-B1] | [Host=nrdbe021] [Svcs=transfer] |
| 95 | Tue Feb 05 17:02:50 GMT 2002 | yes | 17 seconds | VB | [An=804 2725237] [User=U-U] | [Org=Bank_of_America-139684] [Num=8007114307] | [Host=nrdvb051] [Port=T1-Ln_001-B1] | [Host=nrdbe021] [Svcs=transfer] |
| 96 | Tue Feb 05 17:04:21 GMT 2002 | yes | 17 seconds | VB | [An=773 3277698] [User=U-U] | [Org=Bank_of_America-139684] [Num=8007114307] | [Host=nrdvb051] [Port=T2-Ln_026-B26] | [Host=nrdbe021] [Svcs=transfer] |
| 97 | Tue Feb 05 17:04:33 GMT 2002 | yes | 12 seconds | VB | [An=703 8862456] [User=U-U] | [Org=worldcom] [Num=8669266287] | [Host=nrdvb051] [Port=T2-Ln_027-B27] | [Host=nrdbe021] [Svcs=none] |

There are 97 sessions shown.
There were 2 html sessions found.
There were 95 vxml sessions found.
There were 5 in progress sessions found.
There were 0 unknown sessions found.

Select a New Log - Select a New Spy

Services Protecting Your Engineering Resources

Version 1.?

SPYing on services visited within a session

Org = Bank_of_America-139684 Device = VWS/1.2 Source = 2145087711 AccessNumber = 8007114307 RemoteAddr = 166.37.170.228-T1-Ln_001-B1

The following utterances were found in callLog/scargs/2002/02February/05/16-57-14-nrdrc051-Ln_001:
 utt01.wav (14k) | utt02.wav (14k) |

Open call LOG - Open hotword LOG - Analyze call LOG [Normal] [Debug]

The following services were found:

| | Service | Date Requested | Data |
|---|---|---|---|
| 1 | root | Tue Feb 05 16:57:52 GMT 2002 | new session XSsessionId = 166.37.170.22925e65febd1696be5-7ff0, authenticate user defaultUser/Bank_of_America-139684, authorize user defaultUser/Bank_of_America-139684 of subAccountId = 139684, |
| 2 | root | Tue Feb 05 16:57:52 GMT 2002 | n/a |
| 3 | personallocator-transfercall | Tue Feb 05 16:58:12 GMT 2002 | n/a |
| 4 | TCI_139684_Transfercall | Tue Feb 05 16:58:12 GMT 2002 | result = transfer call to 8664309973 |
| 5 | hangup | Tue Feb 05 17:01:39 GMT 2002 | n/a |
| 6 | root | Tue Feb 05 17:01:39 GMT 2002 | n/a |

Fig. 6.

S.P.Y.E.R
Services Protecting Your Engineering Resources
Version 2.1

| Date | [ Prompts ] [ Status ] 630 | Utterance | Status 660 | Duration | Results | |
|---|---|---|---|---|---|---|
| | | | | | Num | Result | Conf |
| 1 | Tue Feb 5 16:57:15 2002 | [ WCCpersonallocatorGenILatencyShort.wav WelcomepersonallocatorService.wav ] [ 1.80049 (COMPLETED) ] 640 | utt01.wav 650 | REJECTED | 14.8073 | 0 | | 0 |
| 2 | Tue Feb 5 16:57:30 2002 | [ BOAwelcometobrokeragecenter.wav BOAwhatserviceshort.wav ] [ 11.0714 (COMPLETED) ] 670 | utt02.wav 680 | RECOGNITION | 4.70682 | 0 | ayecats | 49 |
| | | | | | 1 | agent | 49 |
| 3 | Tue Feb 5 16:57:36 2002 | [ BOAdidntunderstand.wav BOAwhatservice.wav ] [ 3.10579 (BARGE_IN) ] [ BOAtransferringto.wav BOAcustomerservice.wav BOAtransferrecorded.wav ] [ 7.15385 (COMPLETED) ] | N/A | N/A | 205.188 | N/A | 690 N/A | N/A |

Select a New Log - Select a New Spy

Fig. 7.

What Service Dialog State

Confidence Report for 'BOAwhatservice'. Number of sessions used = 134

| Result | Total | | | | Low (< 50) | | | | High (>= 50) | | | |
|---|---|---|---|---|---|---|---|---|---|---|---|---|
| | Count | AvgConf | MinConf | MaxConf | Count | AvgConf | MinConf | MaxConf | Count | AvgConf | MinConf | MaxConf |
| chad bell | 4 | 62 | 52 | 71 | 0 | - | - | - | 4 | 62 | 52 | 71 |
| brad dellinger | 7 | 56 | 49 | 68 | 1 | 49 | 49 | 49 | 6 | 57 | 53 | 68 |
| go brad dellinger | 1 | 44 | 44 | 44 | 1 | 44 | 44 | 44 | 0 | - | - | - |
| SUB-TOTALS | 8 | 54 | 44 | 68 | 2 / 25 % | 46 | 44 | 49 | 6 / 75 % | 57 | 53 | 68 |
| dean lloyd | 2 | 48 | 45 | 51 | 1 | 45 | 45 | 45 | 1 | 51 | 51 | 51 |
| derek vaughn | 1 | 43 | 43 | 43 | 1 | 43 | 43 | 43 | 0 | - | - | - |
| frank @uh@ quaney | 1 | 64 | 64 | 64 | 0 | - | - | - | 1 | 64 | 64 | 64 |
| frank quaney | 4 | 58 | 53 | 74 | 0 | - | - | - | 4 | 58 | 53 | 74 |
| SUB-TOTALS | 5 | 59 | 53 | 74 | 0 / 0 % | - | - | - | 5 / 100 % | 59 | 53 | 74 |
| jason trichler | 2 | 64 | 56 | 73 | 0 | - | - | - | 2 | 64 | 56 | 73 |
| joshua luehmann | 2 | 51 | 48 | 55 | 1 | 48 | 48 | 48 | 1 | 55 | 55 | 55 |
| john pomeroy | 1 | 66 | 66 | 66 | 0 | - | - | - | 1 | 66 | 66 | 66 |
| john pommaroy | 1 | 75 | 75 | 75 | 0 | - | - | - | 1 | 75 | 75 | 75 |
| SUB-TOTALS | 2 | 70 | 66 | 75 | 0 / 0 % | - | - | - | 2 / 100 % | 70 | 66 | 75 |

PROVIDING INFORMATION REGARDING INTERACTIVE VOICE RESPONSE SESSIONS

BACKGROUND OF THE INVENTION

1. Field of the Invention

This invention generally relates to the presentation of information, and more particularly, to providing a consolidated presentation of heterogenous information about user sessions in an interactive voice response unit.

2. Description of Related Art

An interactive voice response (IVR) unit interacts with a caller over a telephone connection and provides information or performs functions as selected by the caller. Usually, the IVR plays a pre-recorded voice prompt querying the user to press a key, perform a certain function or to navigate to other options. The array of options available to the caller in this type of system is often referred to as a "menu." The structure of the menu is often a hierarchical arrangement whereby a user can progress through numerous menu levels. Guided by voice prompts at each level, the user can readily select from among a great many desired functions despite the telephone keypad only having twelve keys.

By using an IVR, a businesses, or, in general any information provider, such as a financial institution, can handle many common requests for information or transactions over the telephone without the intervention of a human employee. This improves the operating efficiency of the business and improves the service to customers for routing requests. It is common for an IVR service to be constantly accessible 24 hours a day. IVR's are applied to automatic order placement, information retrieval, entertainment, and the like, just to name a few examples. Sometimes an IVR is used in conjunction with a call center populated with human operators. The IVR may collect information from a caller initially and then route the caller to an appropriate operator who can provide further assistance.

Recently, speech recognition technology has been integrated into IVR's to form speech recognizing voice response units (SIVR's). During the use of a SIVR, a caller may provide spoken input in response to voice prompts from the SIVR unit. Thus, the caller does not necessarily have use a telephone keypad to provide a response to a prompt. This is especially convenient to users of hand-held phones wherein the keypad is located substantially with the ear piece and mouth piece. With a hand-held telephone, such as a mobile phone, pressing the keys requires momentarily moving the headset away from the user's head so that the user's fingers can reach the keys and the user can see the keys being pressed. This can be hazardous for users who attempt to operate a phone while driving an automobile or performing other activities. The requirement to provide keypad input can also be challenging to persons who have difficulty moving their hands and fingers. Even though a voice response unit can be dialed by a preprogrammed button on a phone, such as a speed dial, the navigation of a menu is typically more variable and requires dynamic choices by the user.

As business and service providers implement SIVR technology, there is a desire to ensure that the quality of service delivered by such installations meets minimum requirements. Companies who serve customers through SIVR systems want to insure the callers can easily and efficiently use the SIVR system without experiencing undue frustration or delay that would reflect poorly on the company. Where a speech recognition system is applied, the recognition accuracy of the speech recognition system is often the limiting factor to the overall performance of the SIVR. This practical limitation is well known in the art. Indeed, to partially compensate for limited speech recognition accuracy, a considerable portion of the skill in implementing a successful SIVR system is in cleverly structuring menus to be forgiving of inaccurate or nonsensical words detected by the speech recognition system.

In practice, speaker-independent and dialect-independent speech recognition has proven difficult to achieve even with a clear, full-bandwidth audio signal from the person speaking. Fortunately, most SIVR installations only rely on spoken digits and yes/no responses or other short responses. In a giving spoken language, a menu maybe designed so that only easily distinguishable words are used at each menu level. This improves the apparent accuracy of the system. There are some SIVR installations that rely on recognizing spoken strings of digits, such as a user account number. In this case, the account numbers are usually not assigned to users sequentially or randomly. Instead, they are carefully chosen so that even that the most similar account numbers are readily distinguishable by at least two or three highly recognizable phonemes or features.

The difficulty of accurate speech recognition is compounded when a remote speaker provides input through an imperfect, limited-bandwidth connection such as a telephone connection. The standard pass-band of a telephone connection is about 300 Hz to 3400 Hz. This prevents the speech recognition system from receiving a vocal fundamental frequency and from receiving high frequency information that distinguishes sibilant sounds. The latter is particularly problematic for accurate speech recognition. Since a human listener can tolerate such impairments by relying heavily on context, the limited bandwidth of a telephone connection is designed to provided merely adequate intelligibility for a human listener. In addition to having limited bandwidth, a telephone channel can also introduce other impairments such as distortion, crosstalk, noise and attenuation. These impairments affect both human and artificial recipients. Furthermore, ambient noise sources, such as automobile traffic and other people can interfere with speech recognition even under otherwise perfect conditions. Some speech recognition technologies may be more robust than others in tolerating these interferences.

SUMMARY

Aspects of the present invention relate to a voice response information gathering and presenting system. The system comprises a voice recognition data interface module that, based on a query received from an interface device, retrieves voice recognition information related to the query from a logging module. A presentation module then organizes the retrieved information and forwards the information to the interface device.

Aspects of the present invention further relate to a method for voice response information gathering and presenting comprising retrieving voice recognition information based on a query from a logging module, and organizing the retrieved information and forwarding the information to an output device.

Aspects of the present invention additionally relate to a voice response information gathering and presenting system comprising means for, based on a query received from an interface device, retrieving voice recognition information related to the query from a logging module. The system further comprises a means for organizing the retrieved information and forwarding the information to the interface device.

Aspects of the invention also relate to a storage media comprising information for voice response information gathering and presenting. The storage media comprises information that, based on a query received from an interface device, retrieves voice recognition information related to the query from a logging module; and information that organizes the retrieved information and forwards the information to the interface device.

These any other features and advantages of this invention are described in or are apparent from the following detailed description of the embodiments.

BRIEF DESCRIPTION OF THE DRAWINGS

The embodiments of the invention will be described in detail, with reference to the following figures, wherein:

FIGS. 2-12 illustrate exemplary screen shots of the voice response session tool according to this invention;

DETAILED DESCRIPTION

Figure 1:
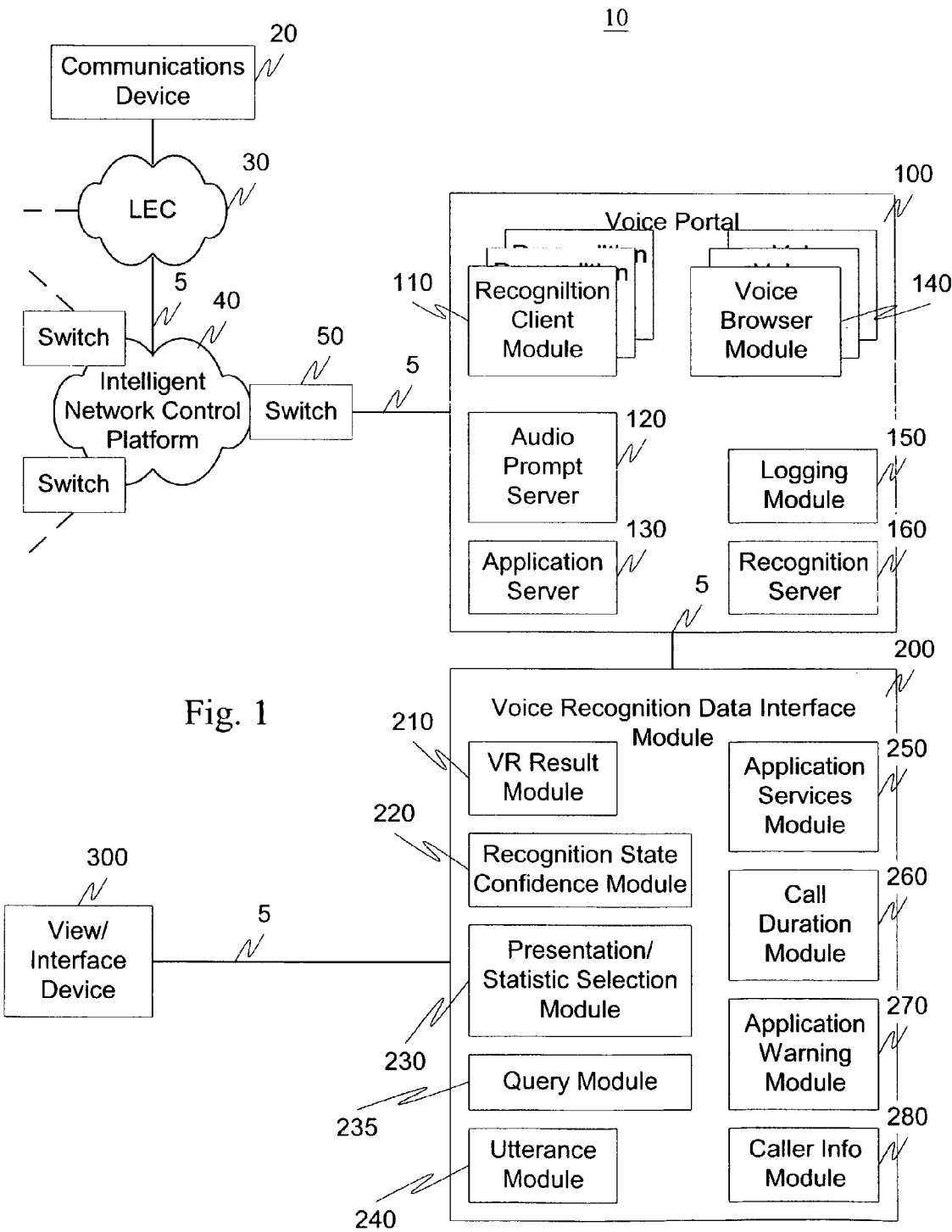
FIG. 1 is a functional block diagram illustrated an exemplary voice response system according to this invention.

Automatic speech recognition quality is of concern to SIVR service providers and is affected by many factors but, of yet, there is no universally-accepted objective measurement of speech recognition quality. Recognition accuracy claimed by a SIVR vendor is difficult to verify. Previously, SIVR vendors have recorded random samples of user interactions to satisfy SIVR service providers that their customers were experiencing acceptable performance from the SIVR. Monitoring the overall quality of a SIVR can be difficult and labor intensive. The recorded samples are simply listened to by human monitors to spot difficulties in the recognition accuracy or the menu structure. Such monitors must often sift through many successful calls before finding a repeatable failure scenario. Once a failure scenario is found manually, then the cause must be determined. The cause may be a noisy phone line, weak speech recognition technology, a poorly designed menu system, or even a bad input signal on the part of the caller.

While the above system allows for the screening of repeatable problem scenarios, it would be useful to provide a consolidated presentation of heterogeneous information that allows for the monitoring of sessions, i.e., a unique access instance to an interactive voice response system, such as, for example voice-based sessions, such as a telephone call.

For example, when a user calls an interactive voice response system, such as a SIVR, the systems and methods of this invention can provide a consolidated view of different aspects of the session, i.e., the call, such as the date and time of the session, the originating telephone number of the session, a reverse look-up of the ANI for directory and location information, caller login information, the types of interactive voice response services accessed, call and service usage duration, actual prompts played to the caller, actual utterances spoken by the caller, voice recognition results and the confidence of utterances and touch tones, system responses, or the like.

For example, session information from multiple, heterogenous systems can be consolidated and made available via, for example, the Internet, to allow for monitoring and rapid response, i.e., trouble shooting, fraud detection, or the like, by users, such as interactive voice response system administrators. However, since the systems and methods of this invention interact via a graphical interface with the raw data associated with an interactive voice response system, it is not necessary to have highly specialized personnel manual to collect, correlate and analyze the complex log information from multiple systems.

For example, using a web browser and application server technology, the systems and methods of this invention are able to consolidate and present session information, for example, from a multi-model session. For example, a web browser can be used to display consolidated session information comprising network information, call logs, location database information, recorded user utterances, voice portal prompts, or any other information associated with the interactive voice response system.

Therefore, the systems and methods of this invention will allow, for example, any user to navigate through a history of a session in an interactive voice response system and determine, for example, what options the caller chose, if there were any problems, and if so, allow them to pinpoint the problems via graphical user interface.

In particular, the exemplary systems and methods of this invention allow a user to obtain information about a session in a voice response system, such as an interactive voice response system. In particular, and in accordance with an exemplary embodiment of this invention, a user, via a graphical interface, navigates through the various types of data that are available, i.e., that were logged or are being logged, as a session transpired or is transpiring. In this way, a user is at least able to view the interactions a caller had with the voice response system, view any errors, and see the outcome of the session. The systems and methods of this invention allow this monitoring to be performed in real-time, or on historical session data.

While the exemplary embodiments illustrated herein show the various components of the voice response session tool collocated, it is to be appreciated that the various components of the voice response session tool can be located at distant portions of distributed network, such as local area network, a wide area network, a telecommunications network, an intranet and/or the internet or within a dedicated voice response session tool system. Thus, it should be appreciated, that the components of the voice response session tool can be combined into one or more devices or collocated on a particular node of a distributed network, such as telecommunications network. As will be appreciated from the following description, and for reasons of computational efficiency, the components of the voice response session tool can be arranged at any location within a distributed network without affecting the operation of the system.

Furthermore, it should be appreciated that the various links connecting the elements can be wired or wireless links or a combination thereof, or any other known or later developed element(s) that is capable of supplying and/or communicating data to and from the connected elements.

Additionally, it should be appreciated while various functional components are illustrated, various other components, such as switches, routers, long distance carriers, or the like, can also be included without affecting the operation of the voice response session tool.

Also, while the systems and methods of this invention will be described in relation to a specific embodiment, it is to be appreciated that the system can be applied with equal success to other types of communications standards and protocols such as voice-over-packet, voice-over IP (VoIP), voice-over network, wired or wireless communications systems, such as mobile phone communications, PDA communications, or the like. In general, the systems and methods of this invention will work equally well with any communication system or protocol where a caller interfaces via a communications device with a voice response system and/or a speech recognition system.

FIG. 1 illustrates an exemplary embodiment of the components associated with the voice response session tool 10. In particular, the system comprises one or more communications devices 20, a local exchange carrier 30, an intelligent network control platform 40, one or more switches 50, a voice portal 100, a voice recognition data interface module 200 and a view/interface device 300, all interconnected by links 5. The voice portal 100 comprises one or more recognition client modules 110, an audio prompt server 120, an application server 130, a voice browser module 140, a logging module 150 and a recognition server 160. The voice recognition data interface module 200 comprises a voice recognition result module 210, a recognition state confidence module 220, a presentation module 230, a query module 235 an utterance module 240, an application services module 250, a call duration module 260, an application warning module 270 and a caller information module 280.

The exemplary systems and methods of this invention will be described in relation to a specific voice response session tool. However, to avoid unnecessarily obscuring the present invention, the following description omits well-known structures and devices that may be shown in block diagram form or otherwise summarized. For purposes of explanation, numerous specific details are set forth in order to provide a thorough understanding of the present invention. It should be appreciated however that the present invention may be practiced in a variety of ways beyond these specific details. For example, the systems and methods of this invention can generally be applied to any type of user driven navigation system.

Additionally, the term module as used herein denotes any piece of hardware, software, or combination thereof, that is capable of performing the functions associated with that element.

In operation, a user at communications device 20, which can be, for example, a telephone, a mobile phone, a VoIP interface, or the like, places a call to the voice portal 100, that at least handles call processing such as an IVR or SIVR menu navigational functions, via a local exchange carrier 30, a intelligent network platform 40, one or more switches 50 and links 5. The intelligent network control platform 40 appropriately routes the caller's call to a recognition client module 110. The recognition client module 110 is connected to a corresponding voice browser module 140 that loads an application from, for example, the application server 130, based on the incoming call. In addition, the logging module 150, upon receiving a call from a caller at communications device 20, commences logging of transactions associated with the call. For example, as discussed hereinafter, the logging module 150 can record the date and time of the session, originating telephone number information, caller login information, the type of services accessed in the voice portal 100, prompts played to the caller, utterances spoken by the caller, voice recognition result information, system responses, and the like.

Once the voice browser module 140 has loaded the correct application, the voice browser commences processing the call in accordance with the loaded application. For example, if the application indicates that it should go into a recognition state, the voice browser module 140 contacts the recognition client module 110 to specify what type of information to listen for from a caller. The recognition client module 110 can then invoke a recognition server 160 to assist in the voice recognition procedure. In response to, for example, a prompt from the audio prompt server 120, the recognition client module 110, in cooperation with the recognition server 160, determines a result or a set of results, i.e., the voice portal's interpretation of what the caller said, forwards this information to the logging module 150, and passes the results to the voice browser module 140. The voice browser module 140 then performs an action based on the determined result.

For example, the audio prompt server 120 can query the user for an account number. The recognition client module 110, having recognized the account number, and in cooperation with recognition server 160, can forward the account number to the voice browser module 140, that can then request, for example, an account maintenance application from the application server 130. The voice browser module 140 can then commence execution of the account maintenance module and prompt the user at communications device 20 for what type of action they would like to perform.

Upon completion of the call, the caller at communications device 20 "logs off" of the voice portal 100 and completes the session. At this time the logging module 150 also closes the session information for that particular call and waits for the next call from a communications device.

At any point in time, including during a call, i.e., real-time, a user at the view/interface device 300, cooperating with the voice recognition data interface module 200 can view information pertaining to one or more sessions that are occurring or have occurred in the voice portal 100. For example, the view/interface device 300 can be a web interface viewed on a web browser, a dedicated voice response session tool interface, an interface on a PDA, or the like. In general, the view/interface device 300 can be any device that is capable of displaying information relating to one or more sessions that are occurring or have occurred on the voice portal 100.

The voice recognition data interface module 200, at the request of a user on the view/interface device 300, interacts with the voice portal 100, and specifically the logging module 150, to retrieve data associated with one or more sessions. In particular, a request for specific information is received from the view/interface device 300. The query module 235 receives the request, determines the type of information requested, and appropriately routes the request to one or more of the other modules in the voice recognition data interface module 200. For example, if the request is for statistics relating to the results of the voice recognition, the request is forwarded to the VR result module 210. If the request regards the confidence level of the voice recognition process, the request is forwarded to the recognition state confidence module 220. If the request is for the utterances of a caller, the request is forwarded to the utterance module 240. If the request is for information regarding which applications were invoked during the session, the request is forwarded to the application services module 250. Requests for call specifics such as the time of call, the duration of call, the date of call, or the like, are forwarded to the call duration module 260. Error requests are forwarded to the application warning module 270 and information requests regarding one or more callers, are forwarded to the caller information module 280.

These modules contact the logging module 150, and any associated databases (not shown) that are storing and or tracking information regarding one or more sessions. Each event that occurs within the session is logged with the logging module.

The module tasked by the query module 235 then identifies and retrieves the relevant information from the logging module 150 and any necessary databases. This information is then forwarded to the presentation module 230 to be organized, for example, in a presentation form, such as a graph, table, chart, report, or the like, and forwarded, via link 5, to the view/interface device 300. In addition to the presentation format, the presentation module 230 can also print the information in, for example, printed form, electronic form, in an e-mail, or in a dedicated and/or predetermined format.

The statistics, reports, or the like, can then be viewed on the view/interface device 300. Furthermore, these reports can be hyperlinked to additional information that may be available about a session such that a user at the view/interface device 300 can interact with the report and these interactions trigger the spawning of another query which is handled by the query module as discussed above. In this way, the user can "drill down" deeper into session data.

In accordance with an exemplary embodiment of this invention, a user, via the view/interface 300, and the query module 235 can dynamically navigate the logs on a log-by-log basis. For example, separate call logs can be setup to represent different clients, different geographic areas, certain classes of callers, or the like. In this exemplary embodiment, the user selects a log, and can then, for example, select to view certain statistics pertaining to that log. However, it should be appreciated, that a user can also select multiple logs and view general statistics for a plurality of sessions across a plurality of logs. Furthermore, a user could select to view statistics about a plurality of sessions within a given log. In general, and with the aid of the view/interface device 300 and the query module 235, a user can view and/or generate a query to retrieve any information about one or more of a log and a session contained in the logging module 150.

Figure 2:
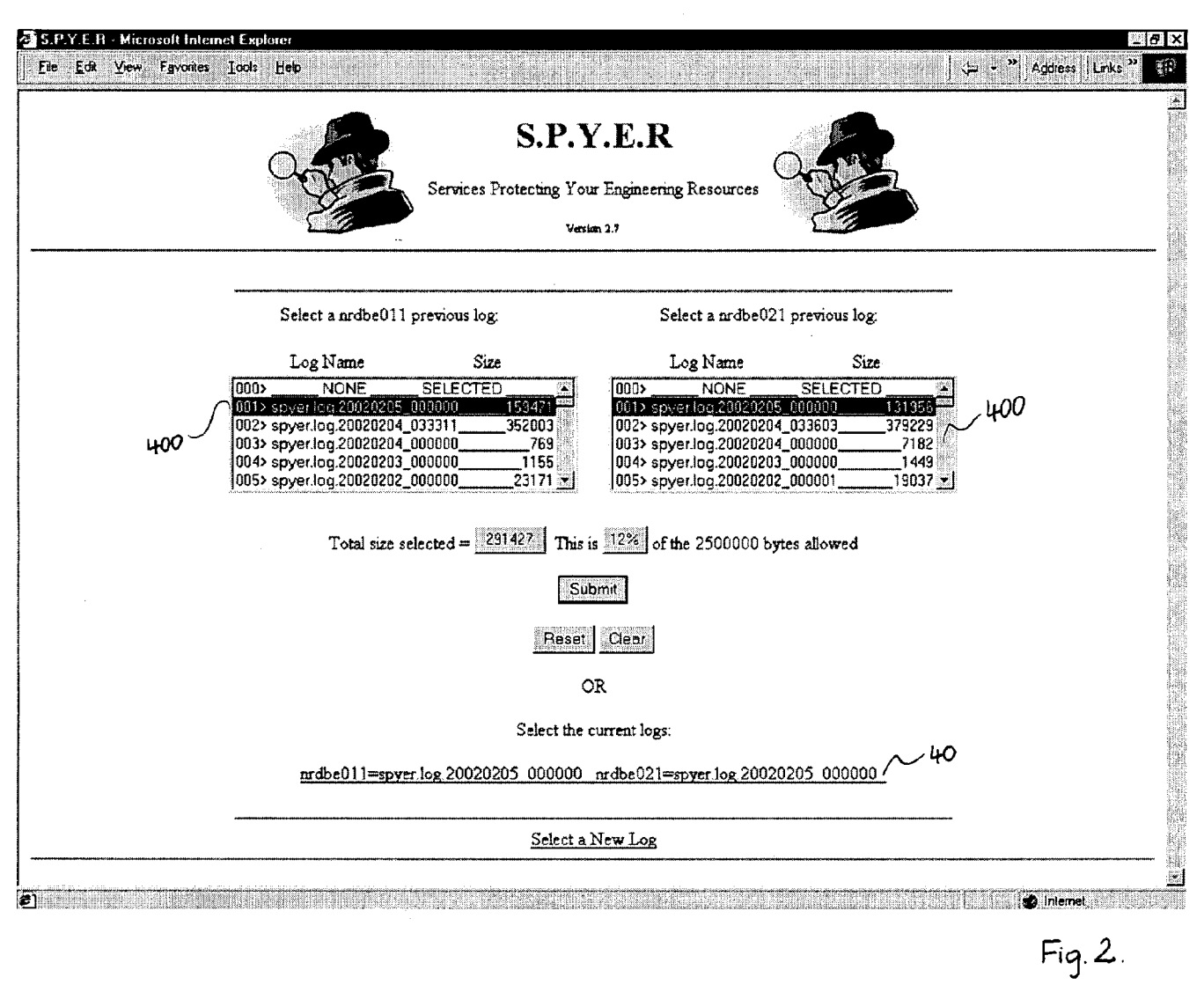

FIG. 2 illustrates an exemplary screen shot of graphical user interface (GUI) that could be displayed on the view/interface device 300. In this interface, a plurality of selectable logs 400 are presented for selection by a user. For example, with a click of the mouse, or other selection tool, a user selects one or more of the logs which is identified as the selected log 410. However, while the following exemplary screen shots reflect an example of how the various portions of data can be displayed and linked, it is to be appreciated that any format, layout and combination of data can be presented and linked based on the specific application.

Figure 3:
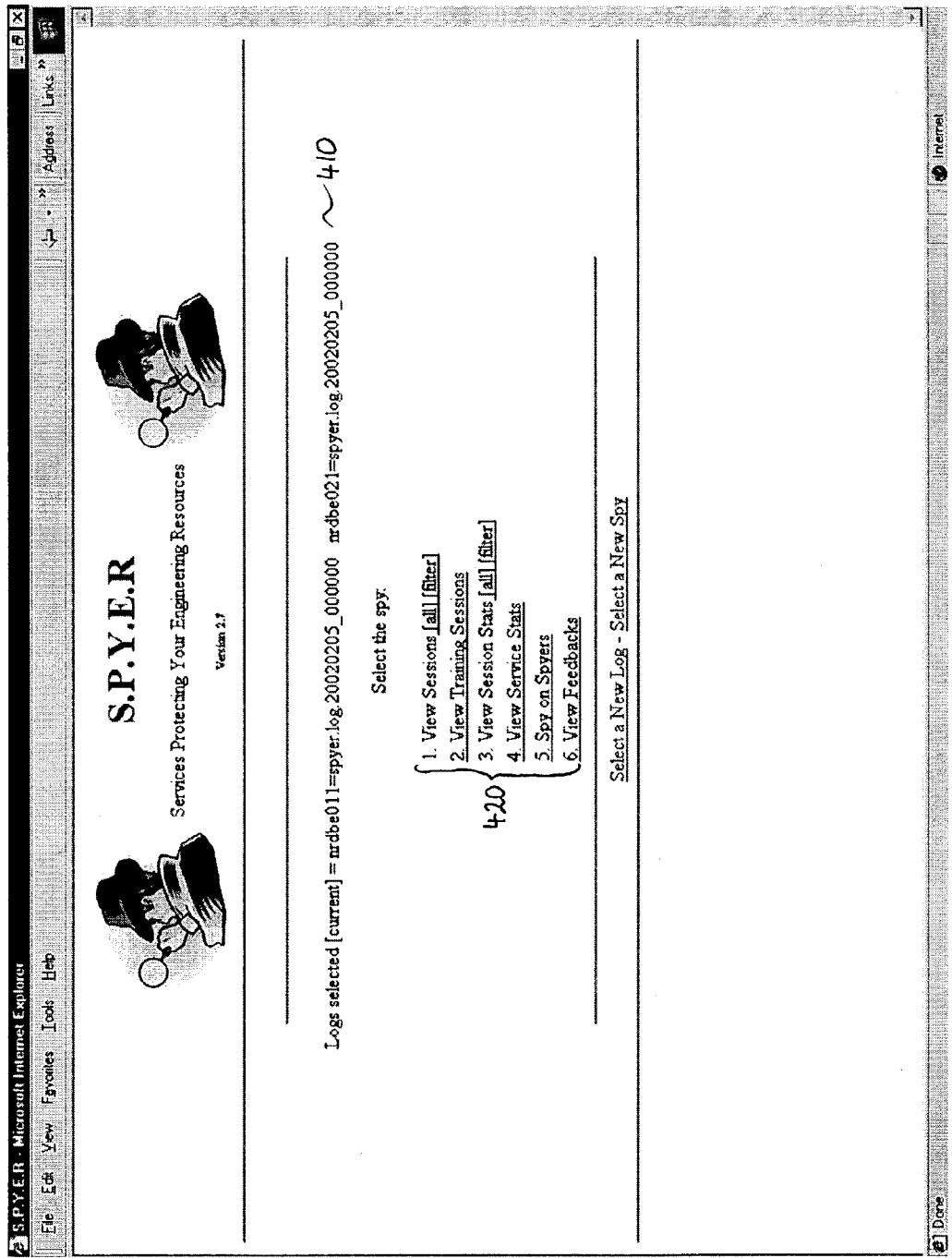

FIG. 3 illustrates an exemplary GUI that can be displayed to the user on the view/interface device 300 upon selecting a log. In addition to displaying the selected log, the GUI illustrated in FIG. 3 also presents a number of selectable hyperlinks 20 that are associated with, for example, certain statistics related to one or more sessions contained in the log. For example, some of the previously defined queries illustrated in FIG. 3 are to view sessions, view training sessions, view session statistics, view service statistics, view statistics regarding other voice recognition session tools and to view feedback.

Upon selecting, for example, the view sessions (all) hyperlink, the GUI illustrated in FIG. 4 can be presented to the user at the view/interface device 300. For example, the GUI illustrated in FIG. 4 illustrates via hyperlink 430 that the "view all" session has been requested and also offers a report selection hyperlink 440. Furthermore, a button that allows the filtering 450 of the session is also provided so that a user may filter sessions based on specific criteria. For example, the user can filter based on calls originating from a certain trunk, or the like. Upon selecting the "view all" session button 430, the sessions associated with the selected log 410 are displayed in the table 460 that appears in FIGS. 4 and 5. The table 460 has a number of exemplary columns that represent data such as when the session was started 470, a status as to whether the current session is in progress 480, a column indicating the current/final duration of session 490, the type of interface device used to access the voice recognition system 500, the source of the session 510, such as the ANI of a caller, the access number 520 dialed by the caller, the remote address 530 and the applications 540 that where executed during the session. In addition to the tabled data regarding the sessions, a summary 550 is provided based on a predetermined set of queries. As illustrated in the table 460, certain aspects of the tabled data can be hyperlinked to allow a user to "drill down" and retrieve further information about the selected statistic. For example, if a user selects session 560, the user can view the actual real-time progress and interactions of the caller with the voice recognition system.

The exemplary GUI of FIG. 6 reflects an exemplary interface a user may see upon selecting the "date started" hyperlink 470 in table 460. In particular, the GUI in FIG. 6 illustrates in tabled form the events that occurred at the applications server in chronological order. In particular, event 570 represents the creating of a new session and event 580 the indication that subsequent to a transfer, there was a hang-up. In addition to the events that occurred, the user also has the option of selecting one or more utterances 590 that are associated with the selected session. Furthermore, a user can select to view the raw call logs 600 and is further allowed to, for example, analyze the call log using a normal 610 or a debug mode 620.

For example, if a user selects the analyze call log normal hyperlink 610, the GUI illustrated in FIG. 7 is generated by the presentation module 230. This GUI outlines the prompts 630 that were played to a caller as well as the status 640 of the prompt. For example, the status can indicate whether the prompt was completed or whether, for example, the caller barged in during the playing of the prompt. Additionally, the utterances spoken by the caller can be accessed by link 650 as well as the status of the voice recognition of the utterance displayed in column 660. Likewise, additional information regarding the duration of call, the recognition state and confidence of the call, and the like, can be shown.

For example, prompt 670 is a prompt that was played to a caller upon the voice recognition system not being able to determine what the caller said. During the playing of the prompt 670, the caller barged in and spoke utterance 680. Column 660 indicates the recognition of the utterance and the results portion 690 indicates two results where determined for this utterance both, with a confidence of 49.

Figure 8:
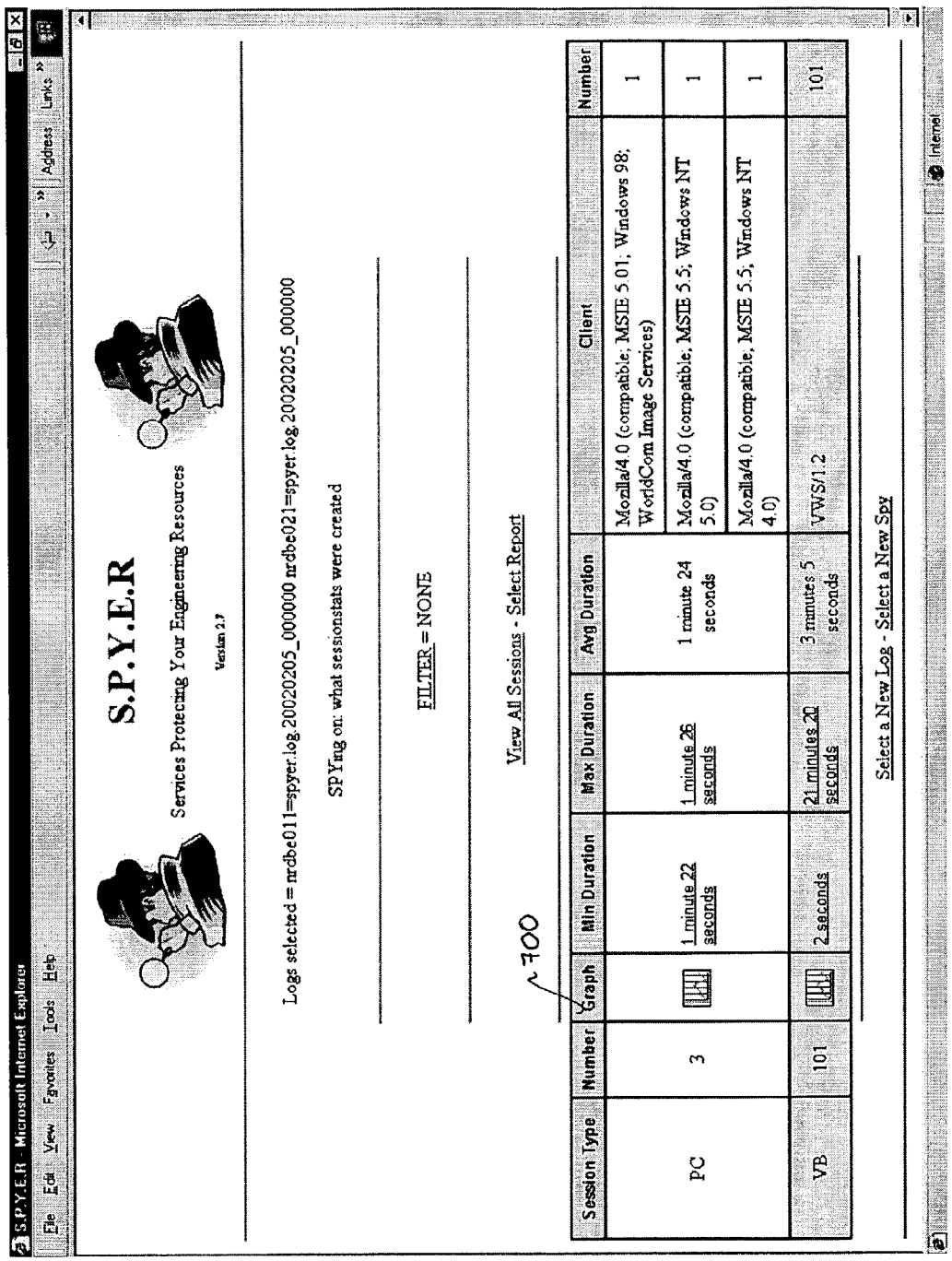
Figure 9:
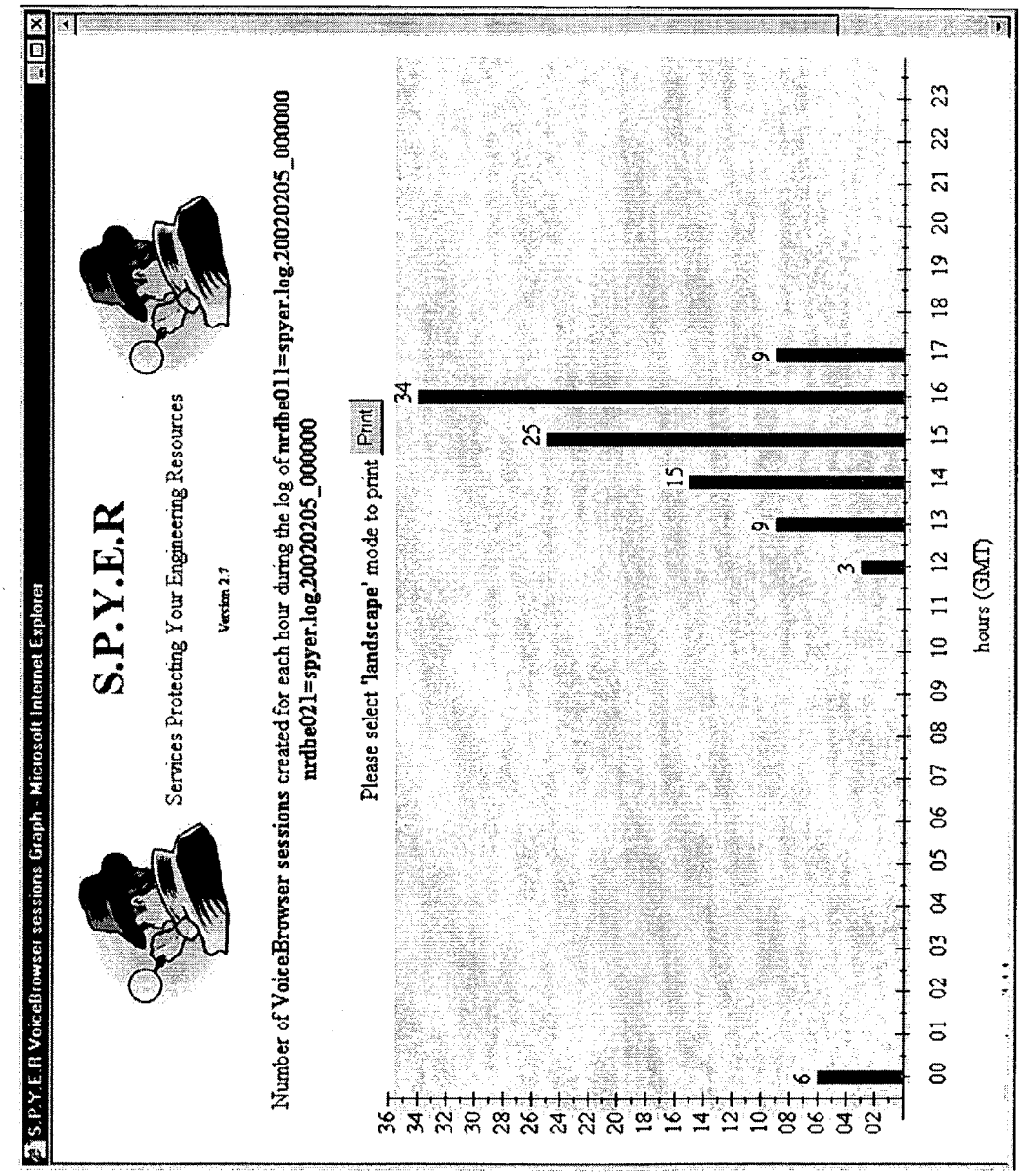

FIGS. 8-9 illustrate the exemplary GUI's for displaying session statistics. For example, if a user selects the view sessions statistics hyperlink 420 a report having, for example, the session type, the number of sessions, the duration of the sessions, and client information can be displayed for the user at the view/interface device 300. As with the previous reports, the user can select a filtering option to sort the session statistics as well as the display format for additional statistics, should additional statistics be desired. For example, if a user selects on the graph icon 700, the GUI illustrated in FIG. 9 shows a landscape version of a session statistics bar graph. As with the previous GUIs, one or more portions of this interface can also be hyperlinked to the underlying data represented in the GUI.

Figure 10:
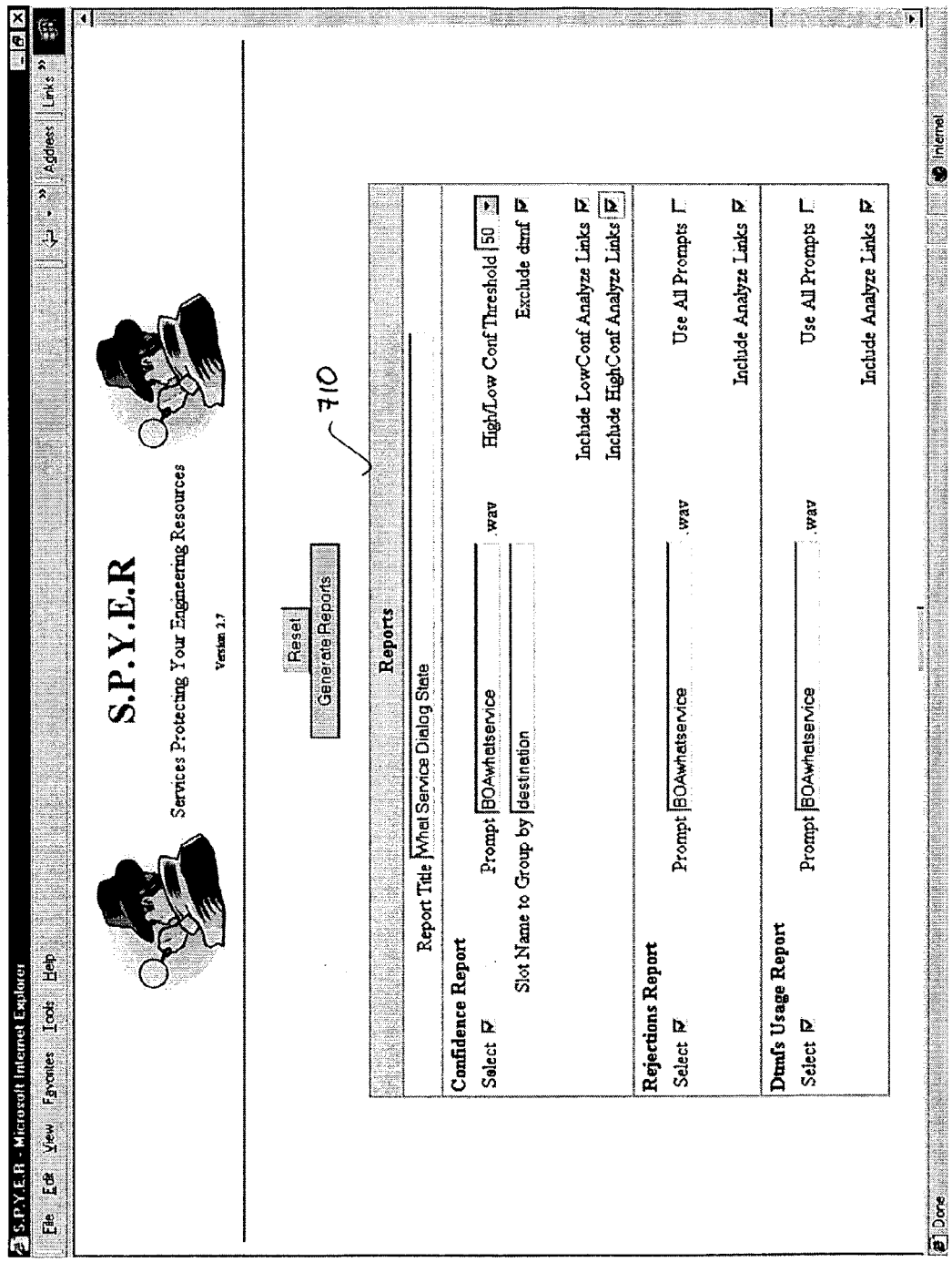
Figure 12:
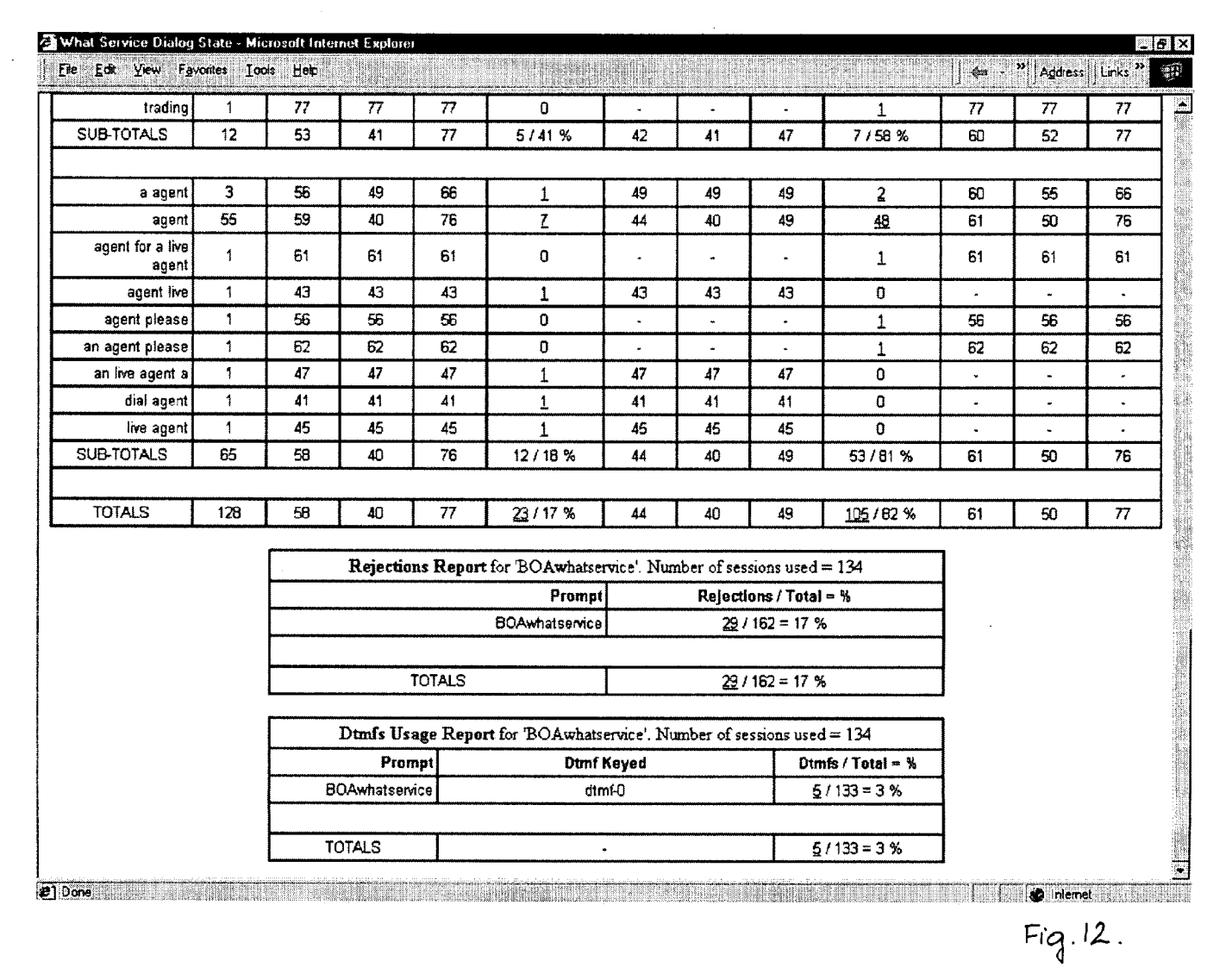

FIG. 10 illustrates an exemplary GUI for a report building interface 710. The interface 710 allows the selection of the report, and the subsequent generation of the report based on, for example, particular data, and one or more filters that can be applied to that data. The GUIs illustrated in FIGS. 11-12 show exemplary reports that can be generated based on the criteria selected in the report interface 710.

Figure 13:
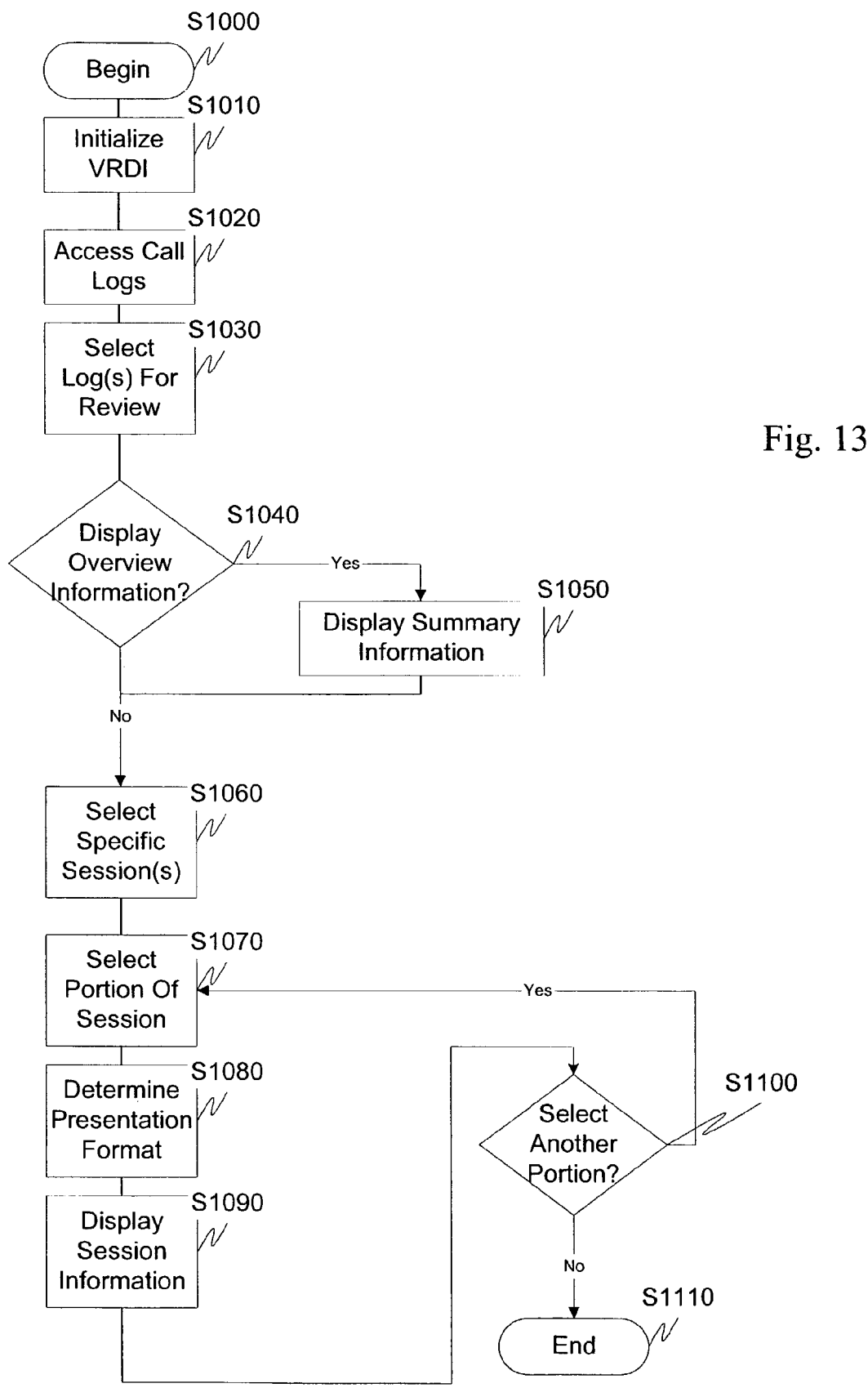
FIG. 13 is a flowchart illustrating an exemplary method of obtaining session information according to this invention and FIG. 14 is a flowchart illustrating in greater detail the select portion of session step of FIG. 13.

FIG. 13 illustrates and exemplary method for operating a voice recognition session tool. In particular, control begins in step S1000 and continues to step S1010. In step S1010, the voice recognition session tool is initialized. Next, in step S1020, a user accesses one or more call logs. Control then continues step S1030.

In step S1030, a user selects one or more call logs for review, for example, via a hyperlink as discussed above. Next, in step S1040, a determination is made as to whether overview information about a the call log is to be displayed. If overview information is to be displayed, control continues to step S1050 where summary or overview information about the selected call log is displayed. Control then continues to step S1060.

In step S1060, one or more specific sessions are selected. Next, in step S1070, one or more portions of that session are further selected. Then, in step S1080, a presentation format for the data associated with the selected portion of the selected session is determined. Then, in step S1090 session information is displayed. Control then continues to step S1100.

In step S1100, a determination is made as to whether additional data has been requested by the user. If additional data has been requested, control jumps back to step S1070. Otherwise, control continues to step S1110 where the control sequence ends.

Figure 14:
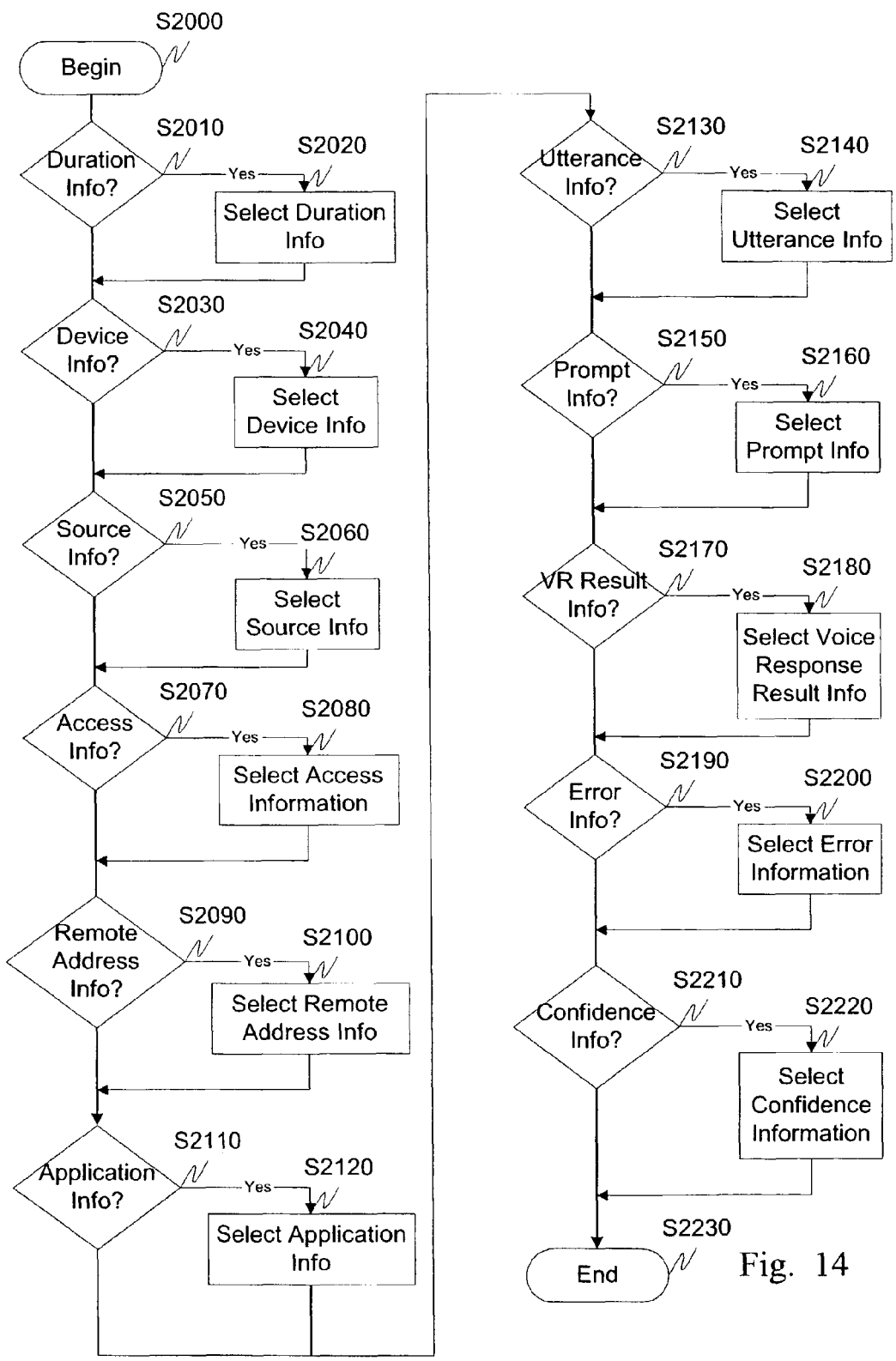

FIG. 14 illustrates in greater detail the select portion of session step S1070. In particular, control begins in step S2000 and continues to step S2010. In step S2010, a determination is made as to whether duration information has been requested. If duration information has been requested, control jumps to step S2020 where the duration information is selected. Otherwise, control continues to step S2030.

In step S2030 a determination is made as to whether device information has been requested. If device information has been requested, control continues to step S2040. Otherwise, control jumps to step S2050. In step S2040, the device information is selected. Control then continues to step S2050.

In step S2050, a determination is made as to whether source information has been requested. If source information has been requested, control continues to step S2060 where the source information is selected. Otherwise control jumps to step S2070.

In step S2070 a determination is made as to whether access information has been requested. If access information has been requested control continues to step S2080 where the access information is selected. Otherwise, control jumps to step S2090.

In step S2090 a determination is made as to whether remote address information has been requested. If remote address information has been requested, control continues to step S2100 where the access information is selected. Otherwise, control jumps to step S2110.

In step S2110, a determination is made as to whether application information has been selected. If application information has been selected, control continues to step S2120 where the application information is selected. Otherwise, control jumps to step S2130.

In step S2130 a determination is made as to whether utterance information has been selected. If utterance information has been selected, control continues to step S2140 where the utterance information is selected. Otherwise, control jumps to step S2150.

In step S2150, a determination is made as to whether prompt information has been selected. If prompt information has been selected control continues to step S2160 where the prompt information is selected. Otherwise, control continues to step S2170.

In step S2170, a determination is made as to whether voice recognition result information has been requested. If voice recognition result information has been requested, control continues to step S2180 where the voice response result information is selected. Otherwise, control jumps to step S2190.

In step S2190, a determination is made as to whether error information has been selected. If error information has been selected, control continues to step S2200 where the error information is selected. Otherwise, control jumps to step S2210.

In step S2210, a determination is made as to whether confidence information has been selected. If confidence information has been selected, control continues to step S2220 where the confidence information is selected. Otherwise, control jumps to step S2230 where the control sequence ends.

As illustrated in the figures, the voice recognition session tool can be implemented either on a single programmed general purpose computer, a separate programmed general propose computer, or a combination thereof. However, the voice recognition session tool can also be implemented on a special purpose computer, a programmed microprocessor or microcontroller and peripheral integrated circuit element, an ASIC, or other integrated circuit, a digital signal processor, a hardwired electronic or logic circuit, such as discrete element circuit, a programmable logic device, such as a PLD, PLA, FPGA, PAL or the like. In general, any device capable of implementing a state machine that is in turn capable of implementing the flowcharts illustrated herein can be used to implement the voice recognition session tool according to this invention.

Furthermore, the disclosed method may be readily implemented in software using an object or object-oriented software development environment that provides source code that can be used on a variety of computer, server, or workstation hardware platforms. Alternatively, the disclosed voice recognition session tool may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer and telecommunications systems being utilized. The voice recognition session tool however, can be readily implemented in hardware and/or software using any know or later developed systems or structures, devices and/or software by those of ordinary skill in the applicable art from the functional description provided herein, and with a general basic knowledge of the computer and telecommunications arts.

Moreover, the disclosed methods may be readily implemented as software executed on a programmed general purpose computer, a special purpose computer, a microprocessor, or the like. In these instances, the methods and systems of this invention can be implemented as a program embedded in a telecommunications system, such as JAVA® or CGI script, as a resource residing on a server or graphics workstation, as a routine embedded on a dedicated voice recognition system, or the like. The voice recognition session tool can also be implemented by physically incorporating the system into a software and/or hardware system such as the hardware and software system of a server and associated interface device.

It is, therefore, apparent that there has been provided, in accordance with the present invention, a voice recognition session tool. While this invention has been described in conjunction with a number of illustrative embodiments, it is evident that many alternatives, modifications, and variations would be or are apparent to those of ordinary skill in the applicable arts. Accordingly, the disclosure is intended to embrace all such alternatives, modifications, equivalents and variations that are within in the spirit and scope of this invention.

What is claimed is:

1. A system comprising:
one or more processors to:
receive a request for information regarding one or more aspects of a plurality of interactive voice response sessions between a plurality of callers and one or more interactive voice response systems;
retrieve, based on the request, the information regarding the one or more aspects of the plurality of interactive voice response sessions;
generate a report based on the information regarding the one or more aspects of the plurality of interactive voice response sessions,
the information regarding the one or more aspects of the plurality of the interactive voice response sessions including information identifying a confidence level of a voice recognition process associated with a particular interactive voice response session of the plurality of interactive voice response sessions; and
provide the report.

2. The system of claim 1, where, when retrieving the information regarding the one or more aspects of the plurality of interactive voice response sessions, the one or more processors are to:
determine a type of information being requested based on the request, and
retrieve, based on the type of information, the information regarding the one or more aspects of the plurality of interactive voice response sessions from a logging module that stores the information regarding the one or more aspects of the plurality of interactive voice response sessions during the plurality of interactive voice response sessions,
the logging module being part of a voice portal that navigates the plurality of callers through the plurality of interactive voice response sessions, and
the one or more interactive voice response systems including the voice portal.

3. The system of claim 1, where the information regarding the one or more aspects of the plurality of interactive voice response sessions further includes statistical data associated with results of voice recognition during the plurality of interactive voice response sessions.

4. The system of claim 1, where the information regarding the one or more aspects of the plurality of the interactive voice response sessions further includes one or more of:
utterances of a caller, of the plurality of callers, during the particular interactive voice response session, or
audio prompts provided to the caller during the particular interactive voice response session.

5. The system of claim 1, where the information regarding the one or more aspects of the plurality of the interactive voice response sessions further includes information regarding an application invoked during the particular interactive voice response session or during another interactive voice response session of the plurality of interactive voice response sessions.

6. The system of claim 1, where the information regarding the one or more aspects of the plurality of the interactive voice response sessions further includes information identifying a duration of a call associated with the particular interactive voice response session.

7. The system of claim 1, where the information regarding the one or more aspects of the plurality of the interactive voice response sessions further includes error data associated with the plurality of interactive voice response sessions.

8. The system of claim 1, where the information regarding the one or more aspects of the plurality of the interactive voice response sessions further includes an identifier associated with a caller, of the plurality of callers, who initiated the particular interactive voice response session.

9. The system of claim 1, where, when providing the report, the one or more processors are to:
provide the report via at least one of a web browser of a particular device that provided the request to the system, an e-mail, or a printed document.

10. A method comprising:
receiving, by one or more devices and from a particular device, a request for information regarding one or more aspects of a plurality of interactive voice response sessions between a plurality of callers and one or more interactive voice response systems;
retrieving, by the one or more devices and based on the request, the information regarding the one or more aspects of the plurality of interactive voice response sessions;
organizing, by the one or more devices, the information regarding the one or more aspects of the plurality of interactive voice response sessions into a report,
the information regarding the one or more aspects of the plurality of interactive voice response sessions including information associated with a confidence level of a voice recognition process during a particular interactive voice response session of the plurality of interactive voice response sessions; and
forwarding, by the one or more devices, the report to the particular device.

11. The method of claim 10, where retrieving the information regarding the one or more aspects of the plurality of interactive voice response sessions includes interacting with a logging module that stores data associated with the information regarding the one or more aspects of the plurality of interactive voice response sessions during the plurality of interactive voice response sessions,
the logging module being part of one of the one or more interactive voice response systems.

12. The method of claim 10, where the information regarding the one or more aspects of the plurality of interactive voice response sessions further includes statistical data associated with results of voice recognition performed during the plurality of interactive voice response sessions.

13. The method of claim 10, where the information regarding the one or more aspects of the plurality of interactive voice response sessions includes information identifying:
utterances of a caller during the particular interactive voice response session, and
audio prompts provided to the caller during the particular interactive voice response session.

14. The method of claim 10, where the information regarding the one or more aspects of the plurality of interactive voice response sessions further includes information regarding an application invoked during another interactive voice response session of the plurality of interactive voice response sessions.

15. The method of claim 10, where the information regarding the one or more aspects of the plurality of interactive voice response sessions further includes information identifying a duration of a call associated with the particular interactive voice response session.

16. The method of claim 10, where the information regarding the one or more aspects of the plurality of interactive voice response sessions further includes error data associated with the plurality of interactive voice response sessions.

17. The method of claim 10, where the information regarding the one or more aspects of the plurality of interactive voice response sessions further includes an identifier associated with a caller, of the plurality of callers, that initiated the particular interactive voice response session.

18. The method of claim 10, where forwarding the report includes:
providing the report via at least one of a web browser of the particular device or an e-mail to the particular device.

19. A system comprising:
one or more devices to:
receive, from an interface device, a request for information regarding different aspects of a plurality of interactive voice response sessions between a plurality of callers and one or more interactive voice response systems;
retrieve, based on the request, the information regarding the different aspects of the plurality of interactive voice response sessions; and
forward the information regarding the different aspects of the plurality of interactive voice response sessions to the interface device,
the information regarding the different aspects of the plurality of the interactive voice response sessions including information identifying a confidence level of a voice recognition process associated with a particular interactive voice response session of the plurality of interactive voice response sessions.

20. The system of claim 19, where the information regarding the different aspects of the plurality of the interactive voice response sessions further includes one or more of:
statistical data associated with results of voice recognition during the plurality of interactive voice response sessions, or
error data associated with the plurality of interactive voice response sessions.

21. A non-transitory computer-readable storage medium storing instructions, the instructions comprising:
one or more instructions that, when executed by at least one processor, cause the at least one processor to:
receive a request for information regarding different aspects of a plurality of interactive voice response sessions between a plurality of callers and one or more interactive voice response systems;
retrieve, based on the request, the information regarding the different aspects of the plurality of interactive voice response sessions; and
provide the information regarding the different aspects of the plurality of interactive voice response sessions,
the information regarding the different aspects of the plurality of the interactive voice response sessions including information associated with a confidence level of a voice recognition process associated with a particular interactive voice response session of the plurality of interactive voice response sessions.

22. The non-transitory computer-readable storage medium of claim 21, where the information regarding the different aspects of the plurality of the interactive voice response sessions further includes one or more of:
information identifying one or more utterances of a caller, of the plurality of callers, during the particular interactive voice response session,
information identifying audio prompts provided to the caller during the particular interactive voice response session,
information identifying an application invoked during the particular interactive voice response session, or
information identifying a duration of a call associated with the particular interactive voice response session.

* * * * *